July 20, 1926.

A. R. COSGROVE 1,593,441

SUPPORT FOR TIRE HANGERS

Filed Sept. 17, 1924    2 Sheets-Sheet 1

Inventor
A. R. Cosgrove
By Bacon & Thomas
Attorneys

July 20, 1926.
A. R. COSGROVE
1,593,441
SUPPORT FOR TIRE HANGERS
Filed Sept. 17, 1924
2 Sheets-Sheet 2
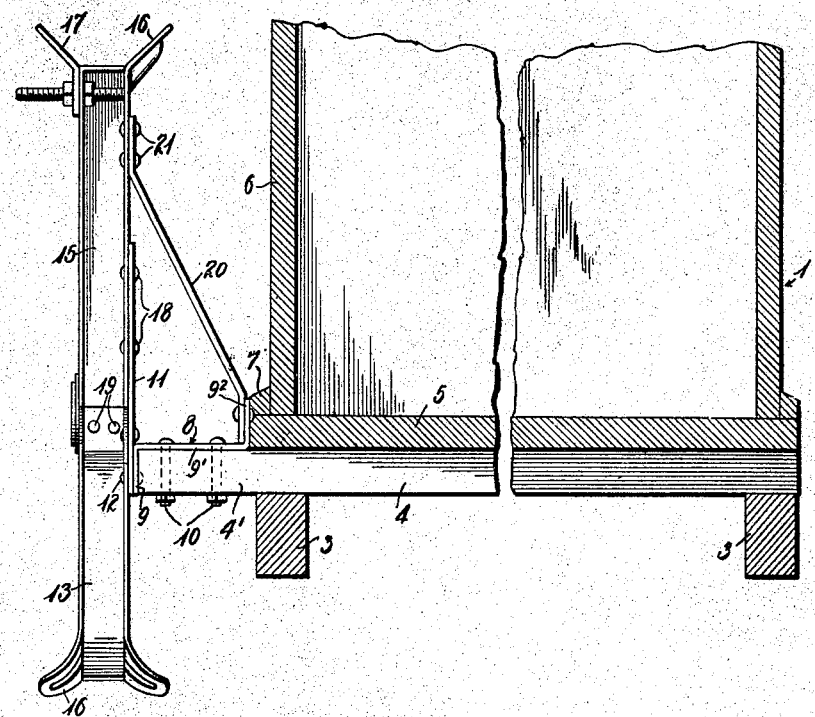
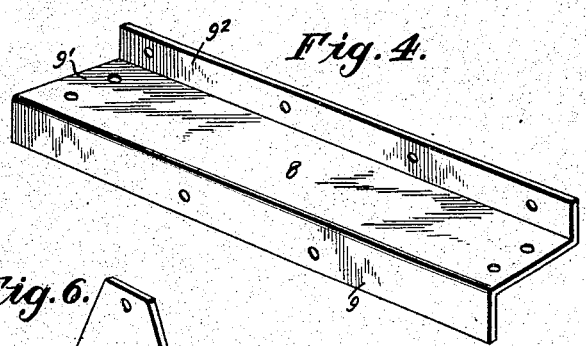
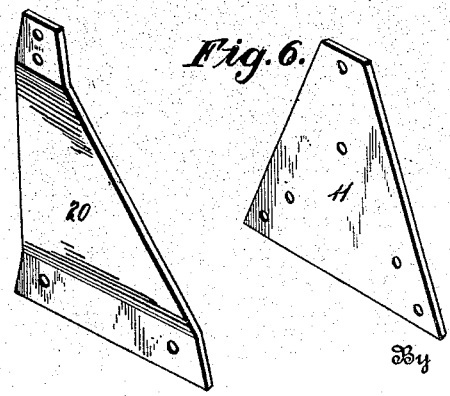
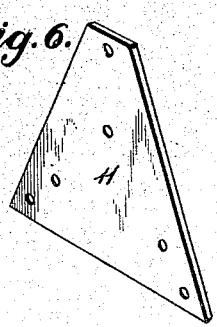
Inventor
A. R. Cosgrove
By Bacon & Thomas
Attorneys Patented July 20, 1926.

1,593,441

UNITED STATES PATENT OFFICE.

ALLEN R. COSGROVE, OF YORK, PENNSYLVANIA, ASSIGNOR TO MARTIN-PARRY CORPORATION, OF YORK, PENNSYLVANIA, A CORPORATION OF PENNSYLVANIA.

SUPPORT FOR TIRE HANGERS.

Application filed September 17, 1924. Serial No. 738,220.

The invention relates to improvements in a tire carrier and supporting means therefor.

In the past considerable difficulty has been experienced in providing for commercial truck bodies a rigid and adequate support for a tire carrier that can be positioned in an accessible location largely due to the fact that said bodies fully cover the chassis and the panels thereof are not sufficiently strong to adequately support a hanger.

It is an object of this invention to provide means for rigidly mounting and supporting a tire hanger from a firm and permanent part of a commercial body so that no stresses or strains are placed on the relatively weak panels of the body.

The invention further aims to provide a support which will permit the hanger to be disposed at either side of the body in a most convenient and accessible position.

From a more specific aspect the invention contemplates lengthening the conventional transverse bolsters of a commercial vehicle body so as to extend beyond the side walls thereof and in interposing between a pair of such bolsters a support to which the tire hanger is attached. It will thus be seen that the hanger is thereby spaced from the body wall and firmly held by the strong bolsters of the body that are amply capable of withstanding such carrying strain.

In the accompanying drawings I have shown one embodiment of this invention for the purpose of illustrating the same.

In the drawings Figure 1 represents a sectional view through the body showing the bolster and the tire supporting member;

Figure 3 is a top plan view; and,

Figure 4 is a detail view of the supporting plate.

Figures 5 and 6 are detail views of the brace and plate.

Figure 1:
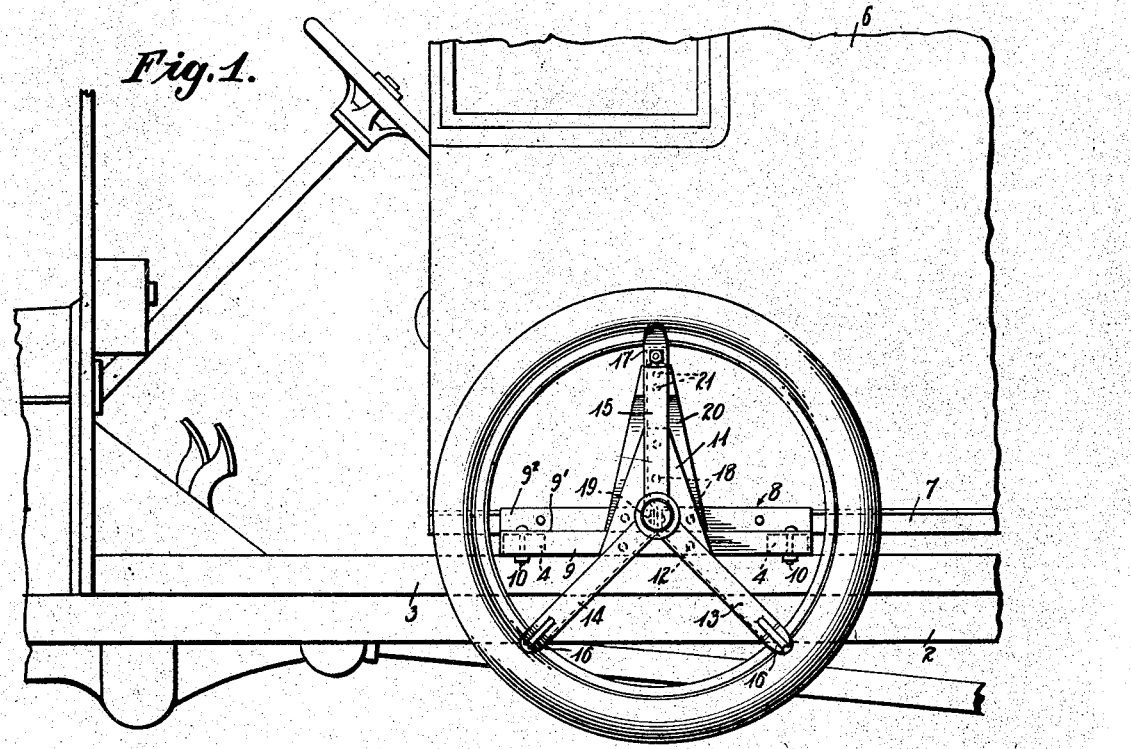
Figure 2:
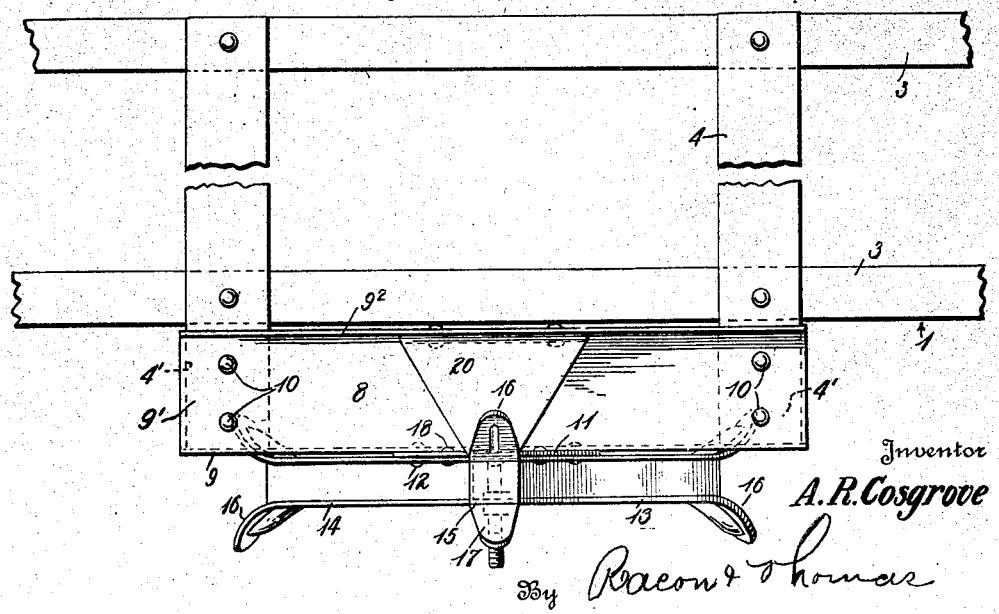
Figure 2 is a side elevation.

Referring now more particularly to the drawings wherein like reference characters indicate corresponding parts, the numeral 1 designates a truck body which may be of any of the well known types. That is to say, the body is one of the commercial or delivery type, although, of course, other types of bodies could be used. The invention, however, is particularly applicable for use in combination with the conventional commercial truck body, such as used on Ford cars, etc.

This body is mounted on the usual chassis 2 and comprises the ordinary longitudinal sills 3 which seat upon the chassis and which sills are of a well known structure.

The body is furthermore provided with the usual transverse bolsters 4 extending across the sills at spaced intervals and composed of relatively heavy material which may be wood, metal or the like. These bolsters are adapted to support the bottom 5 of the body composed of relatively thin strips of wood or other similar materials to which bottom the side panels 6 of the bottom are secured by means of a molding strip 7 and bolts, rivets or the like. It is to be observed that the bottom 5, and the side 6 of the body are both supported on the transverse body bolsters 4, which are in turn supported on the longitudinal sills 3. It is to be here observed that the bolsters 4 project substantially beyond one side wall 6 of the body to provide the integral or permanent extensions 7 which constitute a material part of this invention.

In commercial bodies of this kind considerable difficulty has been experienced in the past in adequately supporting a tire carrier. That is to say because of the structure of the body it has been a problem to body manufacturers to permanently or rigidly support a hanger in a position where it is readily accessible to permit a demountable rim to be removed from the hanger or inserted thereon. Obviously the bottom and side panels of the body are not of material thickness and not sufficiently strong to support the hanger.

It is a salient feature of this invention to provide an adequate support for a tire hanger on a body of this character so that the spare tire need not be suspended or mounted on the fender or running board of a car. To this end two of the bolsters 4 are formed with extensions 7 at one side of the body upon which extensions a hanger support 9 is suspended of a construction to be now described.

This support comprises a metallic member 8 of substantially Z-shaped formation. The down turned flange 9 thereof overlies the extended edge of the bolsters, the base 9' of said supporting member projecting rearwardly and covering the extended portion of each bolster, while the upturned flange 9² lies adjacent the edges of the bottom panels of the body. As will be clearly seen, this supporting member bridges the space between a pair of bolsters and is firmly held in position by fastening rivets or bolts 10 that pass through the bolsters.

Substantially intermediate its ends and between a pair of said bolsters 4 there is attached to the supporting member 8 along the down turned flange 9 thereof by rivets or otherwise a substantially triangular plate 11. This plate is shown as being secured in position by the rivets 12, although it could, of course, be otherwise attached. The plate is adapted to receive and support the demountable rim carrying arms 13, 14 and 15 having the usual rim engaging elements 16, the upper arm 15 being provided with a detachable rim engaging flange 17 by means of which a rim with its tire may be locked in position. The arms 13, 14 and 15 are all riveted by the rivets 18 to the plate 11, it being further apparent that the arms 13 and 14 may be riveted together by the rivet 19. The manner of mounting these arms is of no material consequence because any type of tire carrier can be mounted on the supporting member 8 and its carrying plate 11 without departing from this invention and the present form of carrier is merely shown for the purpose of illustrating the invention. The carrying arm 15 is further braced by the brace rod 20 which is connected by a rivet to the upturned flange 9² of the supporting member 8, the outer end of the brace 20 being connected by the rivets 21 to the arm 17 near its upper end. This not only serves to brace the tire carrier, but also serves to hold the same spaced from the side body walls of the vehicle.

From the foregoing description it will be seen that the tire carrier is mounted on a supporting member which directly rests upon a pair of separated beams extended beyond one side of the body and which beams have ample strength to support the carrier with its load. The carrier is furthermore spaced from the side wall of the body so that a rim with its tire thereon may be readily placed on the carrier or removed therefrom and there is no tendency during the movement of the vehicle of the rim engaging or marring the side wall of the vehicle. It will also be clearly understood that the supporting plate 8 may be materially altered in structure, and if desirable it may be supported on a single bolster. It may furthermore be appreciated that the structure of the tire carrier per se constitutes no material part of this invention, as any approved type of carrier may be used.

Having thus described my invention what I claim is:

1. The combination with a vehicle body having spaced lateral bolsters projecting beyond one side wall of the body, a rigid supporting element disposed between said bolsters and attached to the extended ends thereof, a tire carrier carried by said supporting member and attached thereto intermediate its ends.

2. The combination with a vehicle body having spaced lateral bolsters, a pair of said bolsters projecting beyond one side wall of said body, a substantially Z-shaped metallic supporting member disposed between said bolsters and secured to the extended ends thereof, a tire carrier mounted on said supporting member, and a bracing member carried by one of the flanges of said supporting member and engaging said tire carrier.

3. The combination with a vehicle body having lateral bolsters, a pair of which extend beyond one of the side walls of the body, a supporting member mounted on said bolsters, a tire carrier carried by said supporting member, and a bracing device attached to said supporting member and cooperating with said carrier.

4. The combination with a vehicle body having suitable side walls, a bottom, lateral body bolstering means beneath said body extending transversely thereof, a tire carrier positioned exteriorly of the body beyond one side wall thereof, and means for supporting said tire carrier resting on and solely supported by said lateral body bolstering means.

5. The combination with a vehicle body having suitable side walls, a bottom, lateral supporting bolsters beneath said bottom and extending transversely thereof, and a tire carrier positioned exteriorly of the body and mounted upon and supported directly by a pair of said lateral bolsters, said carrier being disposed adjacent one side wall of the body.

6. The combination with a vehicle body having side walls, a bottom, longitudinal and lateral supporting bolsters beneath said bottom, the lateral bolsters extending transversely thereof, a tire carrier support mounted on and supported solely by a pair of said lateral bolsters, a tire carrier mounted on said support and positioned exteriorly of the body adjacent one side wall thereof.

7. The combination with a vehicle body having side walls, a bottom, transverse and lateral supporting bolstering means beneath said bottom of the body, said lateral bolstering means projecting beyond a side wall of the body, and a tire carrier supported by said extension of the lateral bolstering means and disposed exteriorly of the body adjacent one side wall thereof.

8. The combination with a vehicle body having a bottom and suitable side walls, spaced lateral bolsters for said body, a pair of said bolsters projecting beyond one side wall of the body, and a tire hanger rigidly supported on said projecting ends of said pair of lateral bolsters and lying adjacent the side wall of the body.

9. The combination with a vehicle body having side walls, a bottom, longitudinal and lateral bolstering means disposed beneath said bottom, said lateral bolstering means projecting beyond one side wall of the body, a support mounted on the projecting end of said lateral bolstering means and a tire carrier connected with said support and disposed exteriorly of the body adjacent one side wall thereof.

10. The combination with a vehicle body having side walls, a bottom, longitudinal and lateral bolstering means disposed beneath said bottom, said lateral bolstering means projecting beyond one side wall of the body, a support mounted on the projection of said lateral bolstering means and a tire carrier connected with said support and disposed exteriorly of the body adjacent one side wall thereof and a bracing device interposed between the tire carrier and said side wall of the body.

11. The combination with a vehicle body having suitable side walls, a bottom, longitudinal and lateral bolstering means beneath said bottom of the body, said bolstering means projecting beyond a side wall of the body, a support mounted on said extended portion of the bolstering means and a tire carrier connected with and supported by said support, said carrier being disposed exteriorly of the body and adjacent one side wall thereof.

In testimony whereof I affix my signature.

ALLEN R. COSGROVE.